Oct. 20, 1959    J. E. FREDERICK ET AL    2,909,670
ELECTRIC GOVERNOR FOR PRIME MOVERS
Filed Dec. 20, 1957    3 Sheets-Sheet 1

WITNESSES:
Bernard R. Gregus
Robert C. Baird

INVENTORS
James E. Frederick &
John T. Liebel.
BY
Paul E. Friedemann
ATTORNEY

__

United States Patent Office 2,909,670
Patented Oct. 20, 1959

2,909,670

ELECTRIC GOVERNOR FOR PRIME MOVERS

James E. Frederick, Clarence, and John T. Liebel, Eggertsville, N.Y., assignors to Westinghouse Electric Corporation, East Pittsburgh, Pa., a corporation of Pennsylvania Application December 20, 1957, Serial No. 704,095

8 Claims. (Cl. 290—4)

This invention relates to electric systems of control including magnetic amplifiers, and more particularly to systems of control, for governing the operation of any mechanical load but as herein disclosed for governing the operation of a prime mover, or prime movers, coupled to drive electric generators, or sets of generators, as for example alternators.

The trend in recent years to expect higher and higher performance from electric generating equipment has reached the point of necessitating higher performance from the prime movers driving the generating equipment. These higher performance requirements are essential needs and include, closer steady-state control of prime mover speed on mechanical loads and closer steady-state control of electric frequency of, say, an alternator driven by a prime mover, more reliable and effective load sharing among two or more generating units coupled to prime movers, and, especially, very rapid recovery from transient load changes, and to minimize frequency deviation and provide for a faster recovery from transient load changes.

One broad object of this invention is the provision of accurate and reliable electric governing control means for the prime mover driving electric generating means.

Another broad object of this invention is the provision of means to hold a very close steady-state control of the frequency of an alternator coupled to a prime mover.

It is also an object of this invention to use smaller and less expensive components than used heretofore and yet to obtain an overall higher standard of performance than was possible to obtain heretofore.

It is also an object of this invention to provide for interchangeable use of all components, or parts, regardless of the frequency output of the alternator or service application involved, as for example, service applications involving 15 cycles, 25 cycles, 50 cycles, 60 cycles or 400 cycles, except, of course, for the particular components in the circuitry selected that are frequency responsive.

It is also an object of this invention to accomplish the desired functions without the use of tubes or other fragile components having a rather limited useful life but with the use of components which have a long useful life and which will withstand shock and vibration with no damage to its components.

The objects recited are merely illustrative. Other objects and advantages will become more apparent from a study of the following specification and the accompanying drawings, in which.

Figure 4:
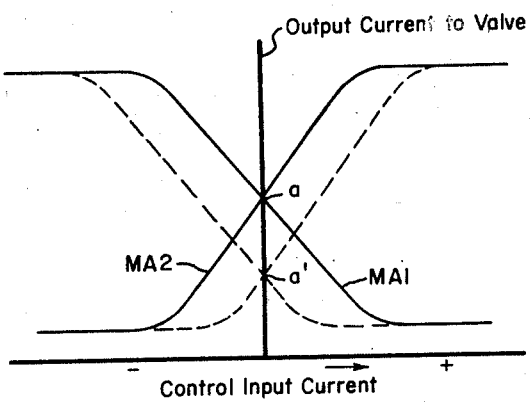
Figure 5:
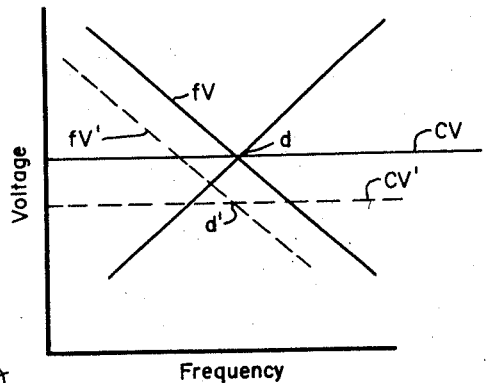
Figure 3A:
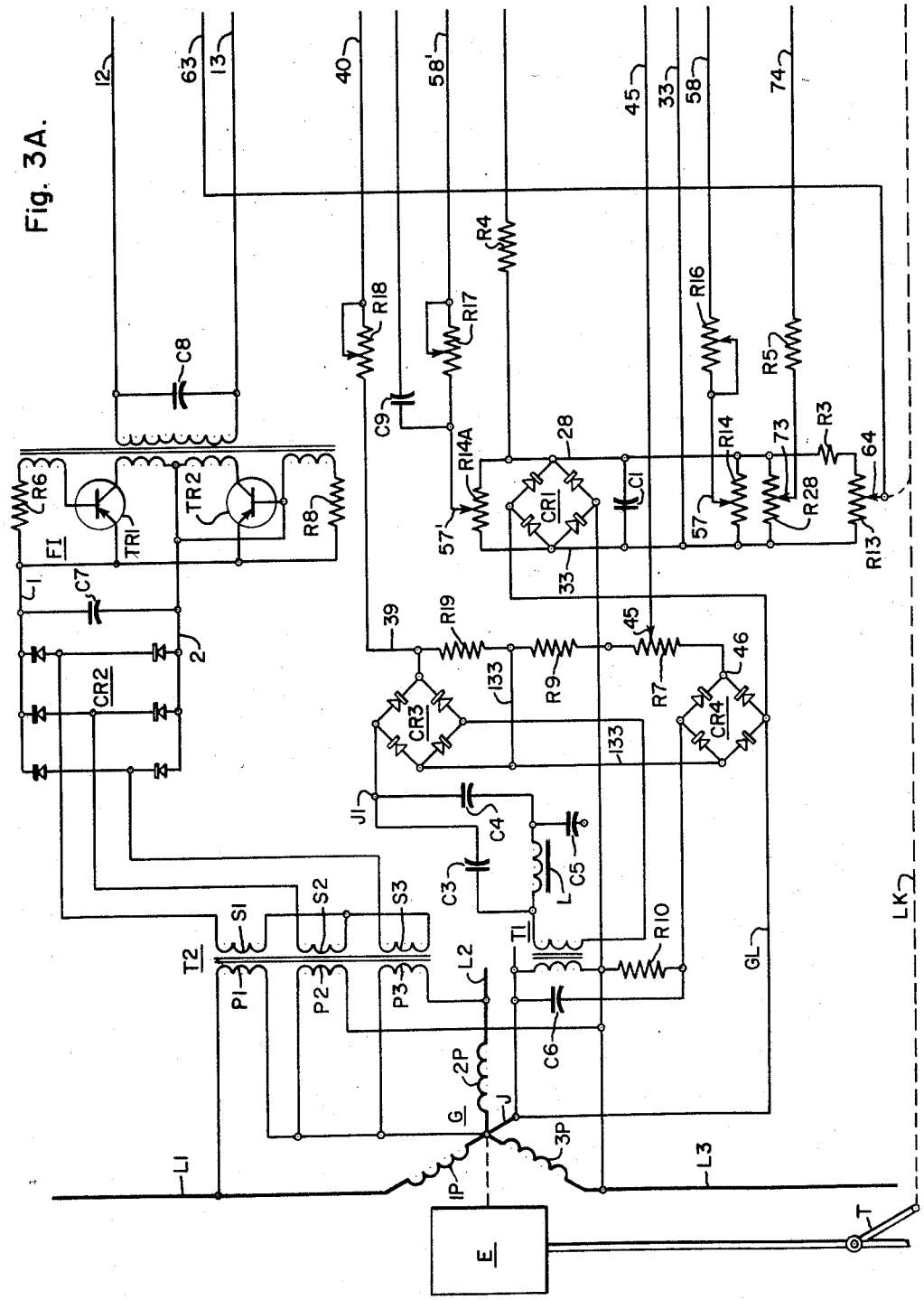
Figure 3B:
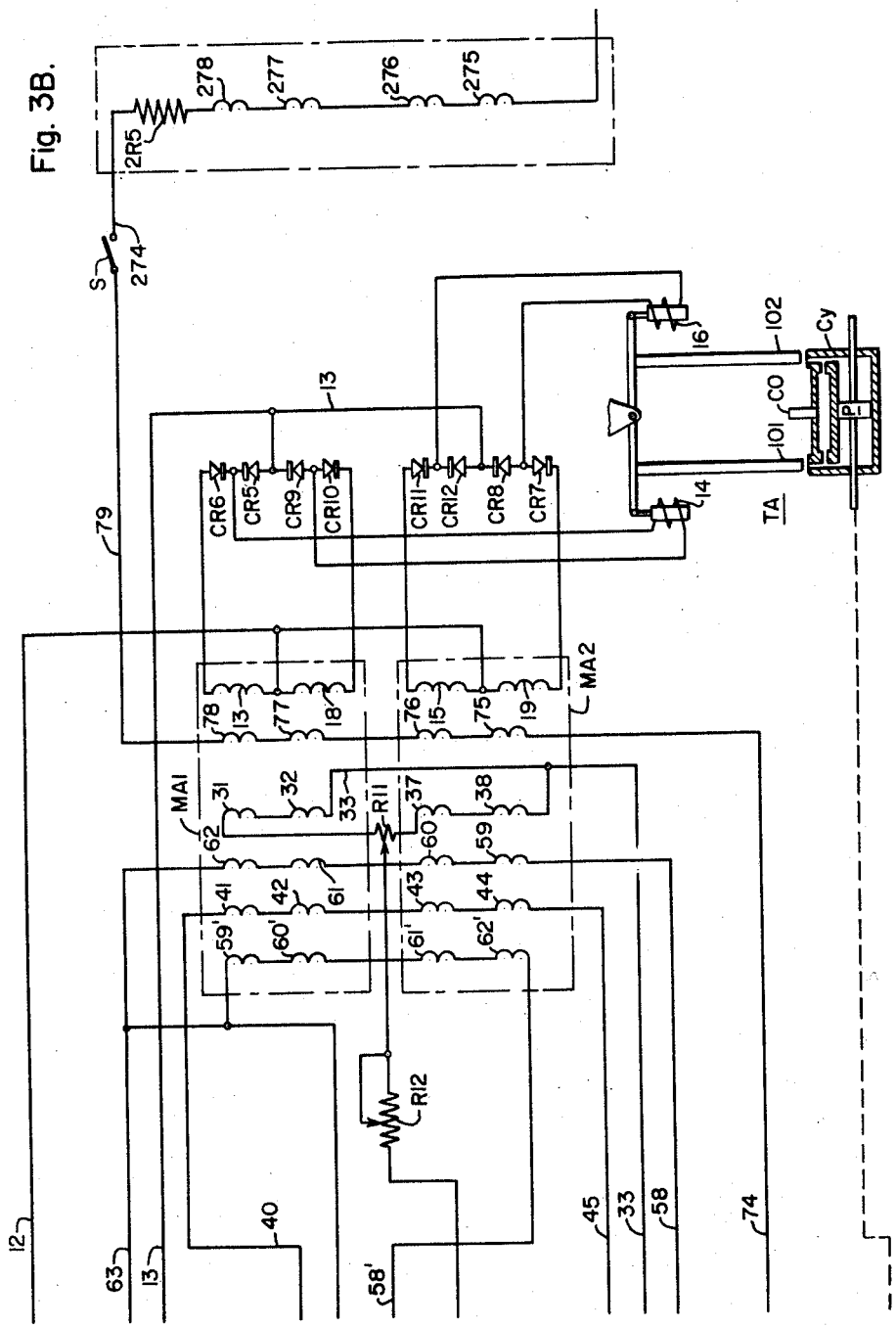

Figs. 3A and 3B together are a diagrammatic showing of the electric apparatus and the prime mover to be controlled;

Fig. 4 shows the operating characteristic of the magnetic amplifiers used; and,

Fig. 5 shows some curves of value in understanding the frequency control of this invention.

Figure 1:
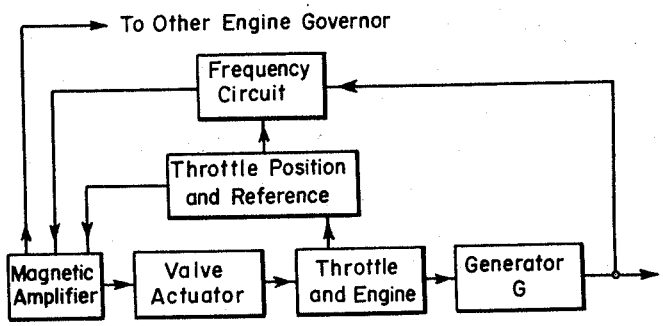
Figure 1 is a schematic showing, in block form, of the electrical elements of this invention.
Figure 2:
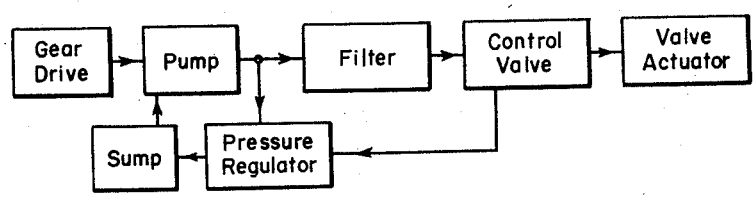
Fig. 2 is a schematic showing, in block form, of the hydraulic apparatus used with this invention.

To gain a broad understanding of this invention, a brief preliminary discussion of Figs. 1 and 2 may be helpful.

The block designated generator represents the alternator G mechanically coupled to the engine included in the block designated throttle and engine. The generator G is electrically connected to a load, not shown.

The throttle of the engine is actuated hydraulically by the valve actuator, which is in turn controlled electromagnetically by the output of the magnetic amplifier.

To provide for proper control of the engine throttle the magnetic amplifier is controlled as a function of the alternator frequency through the frequency circuit. To prevent hunting, and to otherwise improve operation, the magnetic amplifier is controlled by a transient positive feed-back having rapid changes in load and is controlled by means of a negative feedback providing a throttle position reference.

When two alternators are operated in parallel through the throttle position reference a control is also provided on the magnetic amplifier to provide for appropriate load sharing of the two alternators.

To provide the hydraulic control a suitable pump, coupled to the engine through a suitable gear drive, pumps liquid through the filter to the control valve which effects operation of the throttle. To provide for a proper constant liquid pressure in the system a pressure regulator bleeds off the proper amount of liquid from the pump to the sump.

To understand some of the details of this invention reference may be had to Figs. 3A and 3B.

The engine E is shown coupled to drive the alternator G which alternator is in use connected to supply power to leads L1, L2 and L3 and to the control apparatus.

The alternator may be Δ-connected or Y-connected but as shown is a Y-connected machine having the outer terminals of its phase windings 1P, 2P and 3P connected to the load leads L1, L2 and L3, respectively. A transformer T2 has its primary windings P1, P2 and P3, as shown, connected across windings 1P, 2P and 3P, respectively. The secondary windings S1, S2 and S3 of transformer T2 are, as shown, connected to the three-phase full-wave rectifier assembly CR2 connected, as shown, to thus provide a direct current output on leads 1 and 2 for the frequency inverter FI. A capacitor C7 aids in producing a substantially constant direct current voltage across leads 1 and 2 for the remaining and essential portions of the frequency inverter circuitry.

The frequency inverter circuitry includes a pair of switching devices TR1 and TR2 connected to the leads 1 and 2. In this arrangement, each of the devices is in the form of a three electrode semiconductor device commonly referred to as a "transistor."

The construction and function of transistors are well known in the art, but for a more detailed discussion of transistors as applied to the circuitry here shown, reference may be had to the United States Letters Patent No. 2,783,384 of Richard L. Bright et al.

The transistors here used are of the P-N-P junction type and the electrical and magnetic characteristics of the parts, as the resistors R6 and R8 and the electromagnetic windings and the core, and the capacitor C8, are all so chosen that an alternating current of approximately 1000 cycles per second of near square wave form appears on terminals 12 and 13.

The main windings 13 and 18 of the magnetic amplifier MA1 and the main windings 15 and 19 of magnetic amplifier MA2 are thus supplied with an alternating current of 1000 cycles and constant voltage regardless of the frequency output of the generator G. This means the units responsive to the frequency inverter may be used in any application regardless of the frequency of the generator involved. In other words, the benefits of the high-frequency magnetic amplifier and other units are available and may be used interchangeably with generators supplying either 15 cycles, 25 cycles, 50 cycles, 60 cycles or 400 cycles.

Further, if a constant voltage direct current source of energy is available, as from a storage battery, the transformer T2 and the rectifiers CR2 are not needed. It suffices to have an output from an inverter of 1000 cycles per second and a voltage of 8 volts, for the main windings of the magnetic amplifiers.

The engine is controlled by the throttle T, which is actuated by link LK from the throttle actuator TA. The throttle actuator includes a piston P in the cylinder Cy. Liquid under a suitable constant pressure enters conduit CO and thus provides a liquid pressure at both sides of the piston P through the system of conduits shown.

Whether or not the pressure is the same on both sides of the piston P depends on the positions of the valves 101 and 102 with respect to the discharge openings adjacent the bottom ends of the valves. The valves are actuated by push-pull electromagnets having the actuating coils 14 and 16. These coils are in the output circuits of the magnetic amplifiers MA1 and MA2, respectively. The input to the main windings of the magnetic amplifiers is as shown provided from the alternator G, through the frequency inverter FI above discussed.

The energizing circuits for the main windings may be traced from lead 12, when lead 12 is positive, through the main winding 13 of magnetic amplifier MA1, rectifier CR6, actuating coil 14, and rectifier CR9, to the conductor 13. When lead 12 is positive a circuit is also established through the main winding 15 of magnetic amplifier MA2, the rectifier CR11, actuating coil 16, and rectifier CR8 to the lead 13.

When lead 13 is positive a circuit is established through rectifier CR5, coil 14, rectifier CR10, and the main winding 18 of magnetic amplifier MA1 to conductor 12, at the same time a circuit is also established from conductor 13, through rectifier CR12, coil 16, rectifier CR7 and the main winding 19 of magnetic amplifier MA2 to the conductor 12.

From the foregoing, it is apparent that the outputs of the magnetic amplifiers MA1 and MA2 are applied to the actuating coils 14 and 16 in a push-pull manner and the throttle actuator TA for the engine E is thus very effectively and sensitively operated from the magnetic amplifiers.

Since the magnetic amplifiers here used are of the self-saturating type, the true effective function of coils 14 and 16 is thus determined by the total effect of all the control windings on the magnetic amplifiers. The preferred point of operation of each magnetic amplifier used in this control is preferably at, or near, the midpoint of the straight portion of the operating characteristic, as at point $a$ of the operating characteristics shown in Fig. 4. The design and selection of the amplifiers is such that their operating characteristics are substantially the same. Further, the straight portion of the characteristic is preferably quite steep but not actually vertical.

To cause each magnetic amplifier to operate at or near the midpoint as point $a$ of its characteristic, the magnetic amplifiers are provided with bias windings. The bias windings are energized from the rectifier CR1. The alternating current terminals of rectifier CR1 are connected directly across phase 3P, but may be connected to any source of alternating current energy of suitable voltage. The important feature is that a source of constant direct current voltage is available on leads 28 and 33.

To energize the bias windings a circuit is established from the positive conductor 28, through resistor R4, adjustable resistor R12, bias balance adjustable resistor R11, bias windings 31 and 32 of the magnetic amplifier MA1 to the negative conductor 33.

Another energizing circuit is also established from the positive conductor 28 through resistor R4, adjustable resistor R12, the bias balance adjustable resistor R11, the bias windings 37 and 38 of the magnetic amplifier MA2 to negative conductor 33. Since the adjustable resistors R12 and R11 are in the circuits of the biasing windings, these resistors can be used to adjust the bias level, i.e., the "up-and-down" position on the magnetic characteristic of both magnetic amplifiers may be adjusted, as for example to the dotted lines appearing in Fig. 4. Since the relative amount of resistances of the resistors R12 and R11 in the respective circuits of bias windings 31 and 32, and 37 and 38 is adjustable, it is apparent that a decrease of resistance in the circuit of the bias windings 31 and 32 will effect an increase in resistance in the circuit of the bias windings 37 and 38. Of course, the reverse effect is caused by a reverse operation of the adjustable resistor R11.

From the discussion of the circuitry and control of the bias windings it is apparent that the operations of the magnetic amplifiers may be adjusted to any level on the operating characteristic and that balanced operation may be obtained at the levels selected.

The output terminals of rectifier CR1 are also connected to energize several potentiometer circuits. The utility of the potentiometer circuits will become apparent as the description proceeds.

The transformer T1 is provided with a primary winding connected directly across phase 3P and its secondary winding is connected in a loop circuit with a reactor L, having a selected reactance value, a series connected capacitor C4, having a selected capacitance value and the alternating current terminals of rectifier CR3 as shown. A second capacitor C3 having a selected capacitance value is connected in parallel to the reactor L and capacitor C4.

The circuitry just described, assuming particular circuit parameters for the capacitors C3 and C4 and the reactor L, is for a 60 cycle output of transformer T1. When the application calls for a 50 cycle output of transformer T1 then capacitor C4 is disconnected from junction J1 and the lower terminal of capacitor C5, suitable for 50 cycles, is connected to junction J1. If the alternator frequency is still some other value the circuit parameters of elements L, C3, and C4 have to be changed to suit.

The direct current output terminals of the full-wave rectifier CR3 are connected across resistor R19. The connection is such that the negative terminal is connected to conductor 133 and the positive terminal is connected to lead 39 to which the upper junction of the resistor R19 is also connected. The operating characteristics of the elements CR3, L, C3, C4 and the windings of transformer T1 are so selected that the voltage impressed across leads 39 and 133 is rather accurately and sensitively substantially inversely proportional to frequency over a given range which includes the desired operating frequency of the alternator G. A rise of frequency from a selected value causes a decrease in voltage across leads 39 and 133 and a decrease in frequency from a selected value causes a rise in voltage across leads 39 and 133.

A full-wave rectifier CR4 is also connected across phase 3P. The circuit for this rectifier CR4 may be traced from L3 through the resistor R10, the alternating current terminals of rectifier CR4 and ground lead GL to junction J. A filter capacitor C6 is connected directly across the alternating current terminals of rectifier CR4. The direct current terminals of the rectifier CR4 are connected in a loop circuit including the frequency reference potentiometer R7, and the resistor R9 to the negative conductor 133.

As is apparent from the connections of full-wave rectifier CR4 heretofore explained and the showing in Fig. 3A, that the positive terminal of rectifier CR4 is connected to junction 46 to which the lower junction of frequency reference potentiometer R7 is also connected. Since the positive potential at lead 39 is sensitively and accurately variable as a function of the minutest tendency of a change of frequency and the positive potential of junction 46 is fixed the voltage across resistors R7 and R9 thus constitutes a reference voltage. It is apparent that lead 45 may be so positioned on resistor R7 that the voltage drop across leads 39 and 45 will be a function of such minute tendency of a change of frequency.

From explanations made hereinbefore, it is apparent that the voltage drop through resistors R7 and R9 is from positive to negative to junction 133. This means that tap 45 on potentiometer R7 is positive with respect to junction 133. Since junction 39 is positive with respect to junction 133, it is apparent that when the output voltage of rectifier CR4 is constant which for all normal operation of the alternator is constant, and the frequency and voltage output are constant, that tap 45 may be shifted to such a point on resistor R7 that tap 45 has the same positive voltage value as conductor 39. Shifting tap 45 merely means that curve CV may be shifted up or down as required. If the alternator frequency is at the desired value, say 60 cycles, and the alternator voltage is at the desired constant value, then the voltage value across junctions 39 and 133 will be, for example, at $d$ on curve $fV$. By shifting tap 45, the curve CV is shifted until it includes point $d$.

In practice, this is accomplished by shifting tap 45 in such a direction until the voltage across leads 39 and lead or tap 45 is zero. Thereafter, any departure of the frequency from the desired frequency will shift the direct current voltage across lead 39 and tap 45 along curve $fV$. If the frequency increases, lead 39 will have a lower voltage than lead 45 and when the frequency decreases, lead 45 will have a lower voltage than lead 39. The magnitude of the direct current voltage across lead 45 and lead 39 will be a measure of the magnitude of the departure of the frequency from a desired frequency and the sense, or effective polarity of the voltage, will be a function of the direction of the departure of the frequency from a desired frequency.

Changes in alternator voltage have but a small effect, but if there is such a change the outputs of the rectifiers CR3 and CR4 are affected substantially alike. The output from secondary rectifier CR4 during a decrease in voltage will shift curve CV to position CV', and the output of rectifier CR3 will shift curve $fV$ to $fV'$. The difference voltage is still zero since point $d'$ is still at the same frequency value represented by point $d$.

By providing the magnetic amplifiers with control windings responsive to a selected portion of the voltage drop across leads 39 and 45, a control is provided as a function of the minutest departure of frequency of the alternator from a selected value. A minute change of the frequency of generator G with respect to a selected reference frequency suffices to produce a voltage drop across leads 39 and 45. A control effect may thus be produced in the magnetic maplifiers before there is any appreciable change in speed of the prime mover. A change in throttle position may thus be effected before there is a noticeable speed change to counteract the speed change tendency.

In practice, lead 45 is adjusted to such a position on R7 that there is no voltage across leads 39 and 45 when the frequency of the generator G is just right. If for any cause there is a slight change in the frequency in such a direction that lead 39 becomes more positive than lead 45 then an energized circuit is established from lead 39 through the frequency gain adjusting resistor R18, conductor 40, control windings 41 and 42 of magnetic amplifier MA1 and control windings 43 and 44 of magnetic amplifier MA2 to lead 45. If the speed change is such that lead 45 is more positive than lead 39, then the control effect of the control windings 41, 42, 43 and 44 is, of course, in an opposite sense in the respective magnetic amplifiers.

It is, of course, understood that when the lead 39 is more positive than lead 45, then the control effect in magnetic amplifier MA1 is in one sense and the control effect in magnetic amplifier MA2 is in an opposite sense, and when the lead 45 is more positive than lead 39, the control effects in the magnetic amplifiers MA1 and MA2 reverses. The effect is thus a push-pull control on the actuating coils 14 and 16.

A governor control that takes into account frequency changes only may have an excessive drooping frequency versus load characteristic and may hunt, or manifest other minor instabilities, or both. To eliminate such not quite perfect operation, a throttle position feedback control is provided for the magnetic amplifiers.

To accomplish this control a throttle position selecting potentiometer R14, is connected across leads 28 and 33 and a throttle position indicating potentiometer R13 in series with resistor R3 is also connected across leads 28 and 33.

The feedback control is then effected by the circuit from tap 57 on potentiometer R14 through position gain adjusting potentiometer R16, conductor 58, control windings 59 and 60 of magnetic amplifier MA2, control windings 61 and 62 of magnetic amplifier MA1, conductor 63, to tap 64 mechanically coupled to link LK and electrically contacting potentiometer R13.

Any movement of the throttle and thus tap 64 from the desired position unbalances the voltage across taps 57 and 64 and causes a current to flow in the control windings 59, 60, 61, and 62 in this feedback circuit in such a direction to provide a negative push-pull feedback effect. In other words, when tap 57 is more positive than tap 64, then current flows in the direction of the circuit above traced producing a negative feedback, and when tap 64 is more positive than tap 57, then the effect on the respective magnetic amplifiers is reversed but the feedback is still a negative push-pull feedback.

To understand a particular one of the novel features of this invention very brief discussions of somewhat similar prior art electric governors for prime movers will be helpful.

In one prior art governor, disclosed and claimed in the pending application of Frederic P. Emery and Harley A. Perkins, Jr., filed August 16, 1957, Serial No. 678,574 and entitled "Magnetic Amplifier Controlled Electric Governor for Prime Movers" wattmeter circuitry is interconnected with the output leads of the alternator to obtain a load signal. This load signal is used to obtain prime mover speed change anticipation at the time of any load change. This signal is nulled by a signal from a throttle position feedback potentiometer which has an element that moves with the throtttle. Since the wattmeter circuitry provides an output proportional to $EI \cos \theta$ (assuming a constant voltage) voltage changes affect the linearity and response of the governor. And since the signal from the feedback potentiometer nulls the wattmeter circuitry signal, throttle non-linearity due to any condition affects the isochronous operation of the governor.

In a second prior art governor, disclosed and claimed in the pending application of Frederic P. Emery, filed October 28, 1957, Serial No. 692,946 and entitled "Electric Governor for Prime Movers," an improved wattmeter circuitry is used and the governor operates from a magnetic amplifier designed for 1000 c.p.s. With this system the time delays are greatly reduced, and the frequency (speed sensing) gain of the system is very high. This is possible due to the overall inherent greater stability of the system.

To obtain the high frequency gain and to further reduce the time delays and to further improve the stability this invention includes a transistor inverter circuit to convert a 12 volt constant voltage D.C. current to 1000 c.p.s. A.C. at a voltage of 8 volts, a 1000 c.p.s. magnetic amplifier, frequency reference circuitry, throttle position responsive circuitry and positive feedback circuitry. A signal responsive to $EI \cos \theta$ is no longer needed and thus all the involved circuitry for obtaining such a signal is no longer needed.

To obtain the appropriate signal in lieu of the $EI \cos \theta$ signal the magnetic amplifiers are provided with control windings energized as a function of throttle position and control windings providing a throttle position positive feedback, or load level nulling signal. That is, a throttle position signal is still necessary for additional stability at times of load changes. Since there is no wattmeter signal to null the throttle position signal for any particular load on the generator, a throttle position positive feedback circuit has been devised.

The throttle position potentiometer R13 energizes the magnetic amplifier position windings 59, 60, 61 and 62 through the position gain potentiometer R16 and the position reference potentiometer R14 as hereinabove explained. With this control circuit and the others already discussed, the system would be stable, but in going from a no-load condition on the generator G to a full-load condition on the generator G, the governor would possess droop since the frequency sensing circuit, namely control windings 41, 42, 43 and 44 would be bucking the throttle position circuit, namely windings 59, 60, 61 and 62. This droop is proportional to load. To remove the droop, a positive feedback circuit obtaining a voltage from the same throttle position potentiometer R13 through the magnetic amplifier control windings 62′, 61′, 60′, and 59′ is used. The circuit for these windings may be traced from tap 64 on the throttle position potentiometer R13 through conductor 63, control windings 59′ and 60′ on magnetic amplifier MA1, control windings 61′ and 62′ on magnetic amplifier MA2, conductor 58′, frequency regulating potentiometer R17 and tap 57′ to the positive feedback reference potentiometer R14A. A capacitor C9 is connected in parallel to the windings 59′, 60′, 61′, and 62′ and the potentiometer R17.

Windings 59′, 60′, 61′ and 62′ are duplicates in every respect to the windings 59, 60, 61, and 62 but are of opposite polarity. If the resistance R17 is adjusted to have the same resistance value as R16 and the positive feedback reference potentiometer R14A is of the same design as potentiometer R14 and tap 57′ holds the same relative position on R14A as tap 57 holds on R14, then the control signals of the windings 59, 60, 61, and 62 and control windings 62′, 61′, 60′ and 59′ would null each other out under all conditions. This is not desirable.

By the addition of the capacitor C9 and connecting it as shown, a desired time delay is placed in the positive feedback windings which permits these windings to null the effect of the position windings at any particular throttle position but still affect small frequency corrections about any throttle position. For large load transients, the movement of the throttle position potentiometer R13, will expose windings 59, 60, 61, and 62, and 59′, 60′, 61′ and 62′ through capacitor C9 to the same voltage level thus nulling their effects and thus permitting the governor frequency circuit to hold the speed isochronous. Small corrections about any one throttle position will be of such magnitude and duration as to be passed by the capacitor C9 thereby permitting a stabilizing signal from the particular position null of windings 59, 60, 61, and 62, and 59′, 60′, 61′ and 62′ to exist.

When another engine alternator set is used and the two are to operate in parallel then the control windings for paralleling purposes on the magnetic amplifiers MA1 and MA2 and similar ones on the magnetic amplifiers of the other engine alternator set are used to effect proper parallel operation.

The parallel control windings 75, 76, 77 and 78 use the voltage level of the throttle position potentiometer R13 through the load sharing adjustment potentiometer R28 to measure load on the engine. This voltage is to be compared with similar voltage, from the other electric governor equipped set when load sharing isochronous paralleling is required. The circuit for the load sharing control windings may be traced from the tap 73 on the load sharing adjusting potentiometer, through resistor R5, conductor 74, control windings 75, 76, 77 and 78, switch S, conductor 274, resistor 2R5, and control windings 278, 277, 276, and 275 to a potentiometer corresponding to potentiometer R28. The potentiometers R28 provide for adjustment of load sharing characteristics in any ratio.

To briefly summarize some of the advantages of this invention, it is to be noted that the control:

(a) Has a very fast response.
(b) Has less sensitivity to voltage changes.
(c) Is not affected by throttle linearity (altitude, B.t.u. fuel content, fouled plugs, etc.).
(d) Is less than ¼ the volume of prior art controls.
(e) Is half the cost.
(f) Eliminates current and potential transformers of former similar governors.
(g) Without a wattmeter circuitry, the governor is not sensitive to phase loading, and power factor.
(h) Operates at a decreased power level.

While but one embodiment of the invention has been disclosed, it is to be understood that the invention is capable of various adaptations which all fall within the spirit of the invention.

We claim as our invention:

1. In an electric system of control for maintaining the frequency of the alternating current output of an alternator coupled to a prime mover constant, in combination, a throttle for the prime mover, which throttle in use is operable to change the speed of the prime mover, electromechanical means for effecting the operation of the throttle, magnetic amplifier means of a relatively high frequency type for energizing the electromechanical means, means for energizing the magnetic amplifier means from terminals energized with an alternating current of relatively high constant frequency, control means, operable as a function of the frequency of the alternating current output of said alternator, for controlling the operation of the magnetic amplifier means, second control means responsive to throttle position with reference to a selected position for providing a negative control effect on said magnetic amplifier means, and third control means for the magnetic amplifier means for providing a transient positive control effect responsive to throttle position on said magnetic amplifier means.

2. In an electric system of control for maintaining the frequency of the alternating current output of an alternator coupled to a prime mover at a predetermined frequency, in combination, a throttle for the prime mover, which throttle in use is operable to change the speed of the prime mover, electromechanical means for effecting the operation of the throttle to change the prime mover speed, high frequency type magnetic amplifier means for energizing the electromechanical means, means for energizing the magnetic amplifier means for terminals energized with an alternating current of relatively high constant frequency, control means for providing a reference signal as a function of the frequency variation of the alternating current output of said alternator from said predetermined frequency for controlling the operation of the magnetic amplifier means, and further control means responsive to transient changes in throttle position for providing a further transient positive throttle position feedback control effect on said magnetic amplifier means.

3. In an electrical system of control for maintaining the frequency of the alternating current output of an alternator coupled to a prime mover at a predetermined frequency, in combination, a throttle for the prime mover, which throttle in use is operable to change the speed of the prime mover, electromechanical means for effecting the operation of the throttle, high frequency type magnetic amplifier means for energizing the electromechanical means, means for energizing the magnetic amplifier means at a constant high frequency, control means, operable as a function of a frequency variation of the alternating current output of said alternator from said predetermined frequency, for controlling the operation of the magnetic amplifier means, control means responsive to throttle position with reference to a selected position for providing a negative control effect on said magnetic amplifier means, and further control means responsive to changes in throttle position with reference to a selected position for providing a transient positive control effect on said magnetic amplifier.

4. In an electric system of control for controlling the speed of a prime mover, the combination of, a throttle for the prime mover, electromagnetic means for effecting the actuation of the throttle to thus control the speed of the prime mover in accordance with the energization of said electromagnetic means, said prime mover in use being coupled to generating means for generating an alternating current of a selected frequency, circuit means including current rectifying means connected to said generating means for producing a reference signal of a constant direct current voltage independent of changes in frequency of the current produced by said generating means, second circuit means including rectifying means also connected to the generating means for producing a direct current voltage as a function of frequency, third circuit means including a frequency inverter connected to the alternator, magnetic amplifier means having load windings, said load winding being connected to said inverter and connected to energize said electromagnetic means, said magnetic amplifier means having a control winding energized by a direct current that is proportional to the difference between the voltage of the reference signal and the voltage as a function of the frequency of the alternating current generated by the generating means coupled to the prime mover, control means responsive to the throttle position for producing a negative feedback effect in the magnetic amplifier and control means responsive to the throttle position for producing a transient positive feedback effect in the magnetic amplifier means.

5. In an electric system of control for controlling the speed of a prime mover, the combination of, a throttle for the prime mover, electromagnetic means for effecting the actuation of the throttle to thus control the speed of the prime mover in accordance with the energization of said electromagnetic means, said prime mover in use being coupled to generating means for generating an alternating current of a selected voltage and frequency, circuit means connected to said generating means for producing a direct current voltage inversely proportional to any change in the frequency of the alternating current generated by said generating means, a source of direct current voltage of a constant value, mixing circuitry for said direct current voltage inversely proportional to changes in frequency and said direct current voltage of constant value to provide an output as a function of the difference of said direct current voltages, a source of high frequency voltage, high frequency type magnetic amplifier means having its output windings energized from said source of high frequency voltage and connected to energize said electromagnetic means, said magnetic amplifier means having control windings energized by said direct current voltage output of said mixing circuitry, said magnetic amplifier means also having control windings energized as a function of throttle position to produce a negative feedback effect in the magnetic amplifier means and having further control windings responsive to throttle position for producing a transient positive feedback effect in the magnetic amplifier means.

6. In an electric system of control for maintaining the frequency of the alternating current output of an alternator coupled to a prime mover constant, in combination, a throttle for the prime mover for controlling the speed of the prime mover with reference to a selected constant speed, electromechanical means for effecting the operation of the throttle, a source of high frequency alternating current voltage, magnetic amplifier means connected to said source for energizing the electromechanical means, control means, operable as a function of the frequency of the alternating current output of said alternator, for controlling the operation of the magnetic amplifier means, second control means responsive to throttle position with reference to a selected position for providing a negative control effect on said magnetic amplifier means, third control means responsive to a transient voltage for providing a positive control effect on said magnetic amplifier means as a function of throttle position, a second electric system of control and apparatus to be controlled as hereinbefore recited, and further control means responsive to the difference of the throttle positions of the two systems for controlling the relative effects of the two magnetic amplifier means involved to balance the loads on the two alternators.

7. In an electric system of control for maintaining frequency of the alternating current output of an alternator coupled to a prime mover at a predetermined frequency, in combination, a throttle for the prime mover to change the speed of the prime mover, electromechanical means for effecting the operation of the throttle to change the prime mover speed, a source of high frequency constant voltage alternating current, magnetic amplifier means connected to said source for energizing the electromechanical means, control means for providing a reference signal as a function of the frequency variation of the alternating current output of said alternator from said predetermined frequency for controlling the operation of the magnetic amplifier means, further control means responsive to changes in throttle position for providing a transient positive throttle position feedback control effect on said magnetic amplifier means, a second electric system of control and apparatus to be controlled as hereinbefore recited, and still further control means responsive to the difference of the throttle positions in the two systems for controlling the relative effects of the two magnetic amplifier means involved to balance the loads of the two alternators.

8. In electric control apparatus for controlling the operation of a prime mover, said control apparatus including an alternating current generator coupled to the prime mover, isolation transformer means connected to the generator, rectifying means, connected to the generator, for producing a constant voltage direct current output, LC circuitry including rectifying means, connected to the transformer means, for producing a direct current output voltage highly sensitive to the minutest change in frequency of the generator, the combination of a control member for said prime mover, electromagnetic means for controlling the position of said control member to thereby control the operation of said prime mover in accordance with the energization of said electromagnetic means, a source of high frequency alternating current, electrical amplifier means having main windings energized from said source of high frequency and having its output connected to energize said electromagnetic means, control means connected to both of said rectifying means for controlling said electrical amplifier means as a function of the voltage difference between the constant direct current voltage and the frequency sensitive direct current voltage to thus effect energization of said electromagnetic means in accordance with said voltage difference, control means responsive to throttle position for producing a negative feedback in the magnetic amplifier means, and further control means responsive to throttle position for producing a transient positive feedback as a function of throttle position.

References Cited in the file of this patent

UNITED STATES PATENTS

| | | |
|---|---|---|
| 2,504,768 | Watson et al. | Apr. 18, 1950 |
| 2,558,729 | Buechler | July 3, 1951 |
| 2,631,268 | Ransom et al. | Mar. 10, 1953 |
| 2,663,840 | Haas | Dec. 22, 1953 |
| 2,692,366 | Ransom et al. | Oct. 19, 1954 |
| 2,780,733 | Chyber | Feb. 5, 1957 |
| 2,790,090 | Hinde et al. | Apr. 23, 1957 |
| 2,790,126 | Fairweather | Apr. 23, 1957 |